No. 632,709.  
S. B. FOWLER.  
TELEPHONE SYSTEM.  
(Application filed Aug. 25, 1898.)

Patented Sept. 12, 1899.

(No Model.)

Attest:  
A. W. Jesbera  
A. H. Scobel.

Inventor:  
Samuel B. Fowler  
by Redding, Kiddle & Greeley  
Attys.

THE NORRIS PETERS CO., PHOTO-LITHO., WASHINGTON, D. C.

UNITED STATES PATENT OFFICE.

SAMUEL B. FOWLER, OF TARRYTOWN, NEW YORK.

TELEPHONE SYSTEM.

SPECIFICATION forming part of Letters Patent No. 632,709, dated September 12, 1899.

Application filed August 25, 1898. Serial No. 689,452. (No model.)

*To all whom it may concern:*

Be it known that I, SAMUEL B. FOWLER, a citizen of the United States, residing in Tarrytown, in the county of Westchester, in the State of New York, have invented certain new and useful Improvements in Telephone Systems, of which the following is a specification, reference being had to the accompanying drawings, forming a part thereof.

This invention relates to telephone systems or circuits of that class in which the battery or other source of current-supply is centralized at one point, as at the central office or exchange, in contradistinction from systems in which local batteries are employed, located at the subscribers' stations. Various arrangements, of which a centralized battery forms a part, have been proposed and to some extent tested heretofore, but through waste of battery-power or complication or other disadvantages and defects they have failed to come into general use.

The improved system which is the subject of the present invention is economical in operation and highly efficient in use under all conditions. It is capable of application to existing plants without requiring all of the instruments to be rearranged, it being possible for an instrument operating on the improved plan to be used in communication with an instrument operating on the plan now generally in use. It does not require the battery-current to be carried all around the line, and in operation between two distant exchanges each equipped with the new system it becomes unnecessary for the battery-current to be carried over the long toll-line connecting the exchanges, secondary current being practically all that flows over such line.

The improved system will be more fully described hereinafter with reference to the accompanying drawings, in which—

Figure 1:
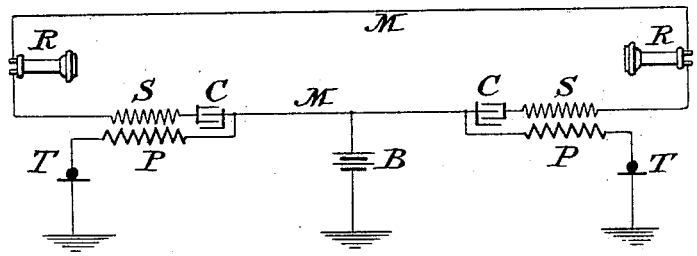
Figure 2:
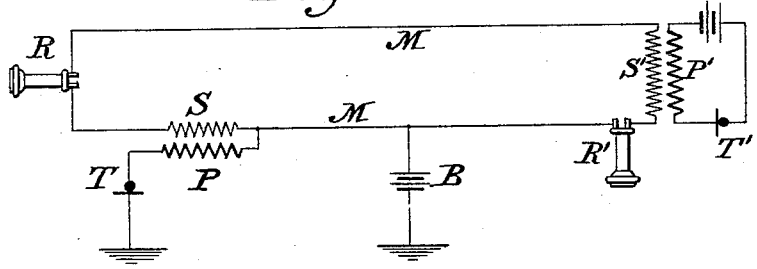
Figure 3:
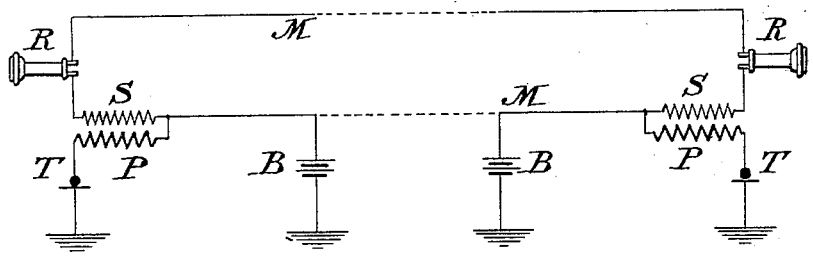
Figure 4:
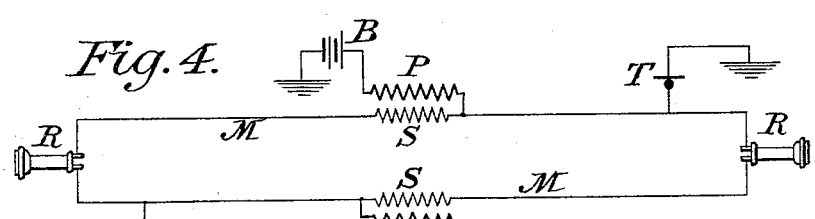

Figure 1 is a diagram of the improved system in operation between two subscribers' stations both of which are equipped in accordance with the invention. Fig. 2 is a similar diagram illustrating the operation of a station equipped in accordance with the new plan connected with a station equipped in accordance with the plan now commonly used. Fig. 3 is a similar diagram illustrating the operation of the invention between two widely-separated exchanges, and Fig. 4 is also a similar diagram illustrating a different disposition of the induction-coils.

As indicated in the several figures of the drawings, the battery or other source of current-supply B is centralized at some convenient point, such as the central office or exchange, and is connected at one end to the main metallic circuit M and at the other end to the return-circuit, which in this instance is through the ground. The main circuit is represented as directly connecting two subscribers' stations; but it will be understood that the connections may be made by any usual or preferred devices through an exchange or otherwise between any two instruments or more. At each subscribers' station or wherever else may be the instrument to be connected is located an induction-coil, the secondary winding S of which is included in the main circuit, together with the receiver R. The primary winding P of each induction-coil is connected at one end to the main circuit and at the other end to the return-circuit or ground, the transmitter F being also included in the connections with the primary winding. In Fig. 1 both instruments or sets of instruments are represented as connected to the main circuit in the same manner, but in Fig. 2 only one instrument, at the left, is represented as connected in accordance with the invention, the other instrument, at the right, being represented as having its receiver R' included in the main circuit, while its transmitter T' is included in a local circuit. This is intended to illustrate the applicability of the invention to existing plants without alteration of the instruments already installed.

In the event of communication between two widely-separated exchanges both of which are equipped with the invention, as indicated in Fig. 3, it will be evident that practically no current from either battery or source of supply will be carried over the long toll-line between the exchanges, but only the secondary current. The current of each battery finds an easier path through the exchange in which such battery is located to earth.

It will be understood that the centralized battery B may be common to a number of switchboard connections and circuits, and it will also be evident that during communication between two stations of the same exchange both primary current and secondary current will flow at the same time over the same wire between the battery and the respective stations.

If considered desirable, condensers C may be cut in, as indicated, in order to prevent trouble from outside currents.

It is obviously immaterial where in the circuit the induction-coil is located. Thus, as shown in Fig. 4, for example, it may be located at the exchange, where it can be made common to different subscribers. The secondary is in the main circuit, as before, and the primary is connected to the return-circuit or ground at the exchange through a battery.

I claim as my invention—

1. A main, metallic, telephone-circuit, an independent return-circuit, and a source of current-supply connected directly to one side only of said main circuit and to the independent return-circuit, in combination with an induction-coil having its secondary winding included in the main circuit and its primary winding connected at one end to the main circuit and at the other end to the return-circuit, a receiver in the main circuit with the secondary winding and a transmitter included in the connections of the primary winding, whereby battery-current flows over only one side of the main circuit and the return-circuit, substantially as shown and described.

2. A telephone system comprising a main, metallic circuit, a source of current-supply connected directly to one side only of said main circuit and to the ground, induction-coils having each its secondary winding included in the main circuit and its primary winding connected at one end to the main circuit and at the other end to the ground, receivers in the main circuit, and a transmitter included in the connections of each of the primaries, whereby battery-current flows over only one side of the main circuit and through the ground substantially as shown and described.

This specification signed and witnessed this 19th day of August, A. D. 1898.

SAMUEL B. FOWLER.

In presence of—
ANTHONY N. JESBERA,
W. B. GREELEY.